(No Model.)  2 Sheets—Sheet 2.
G. W. WASHBURN.
MACHINE FOR DELINTING COTTON SEED.
No. 543,202. Patented July 23, 1895.
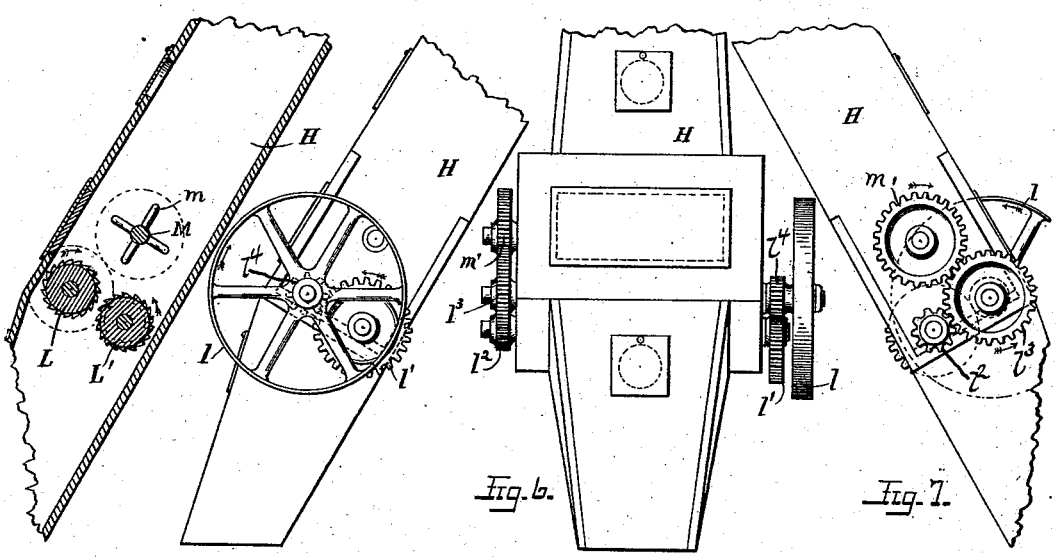
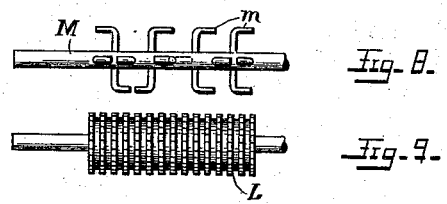
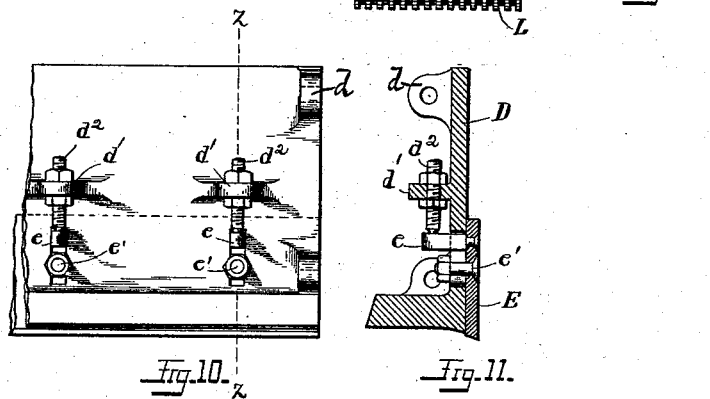
Witnesses:
Ralph C. Enyart
Emma Lyford
Inventor:
George W. Washburn
By Geo. J. Murray
Atty

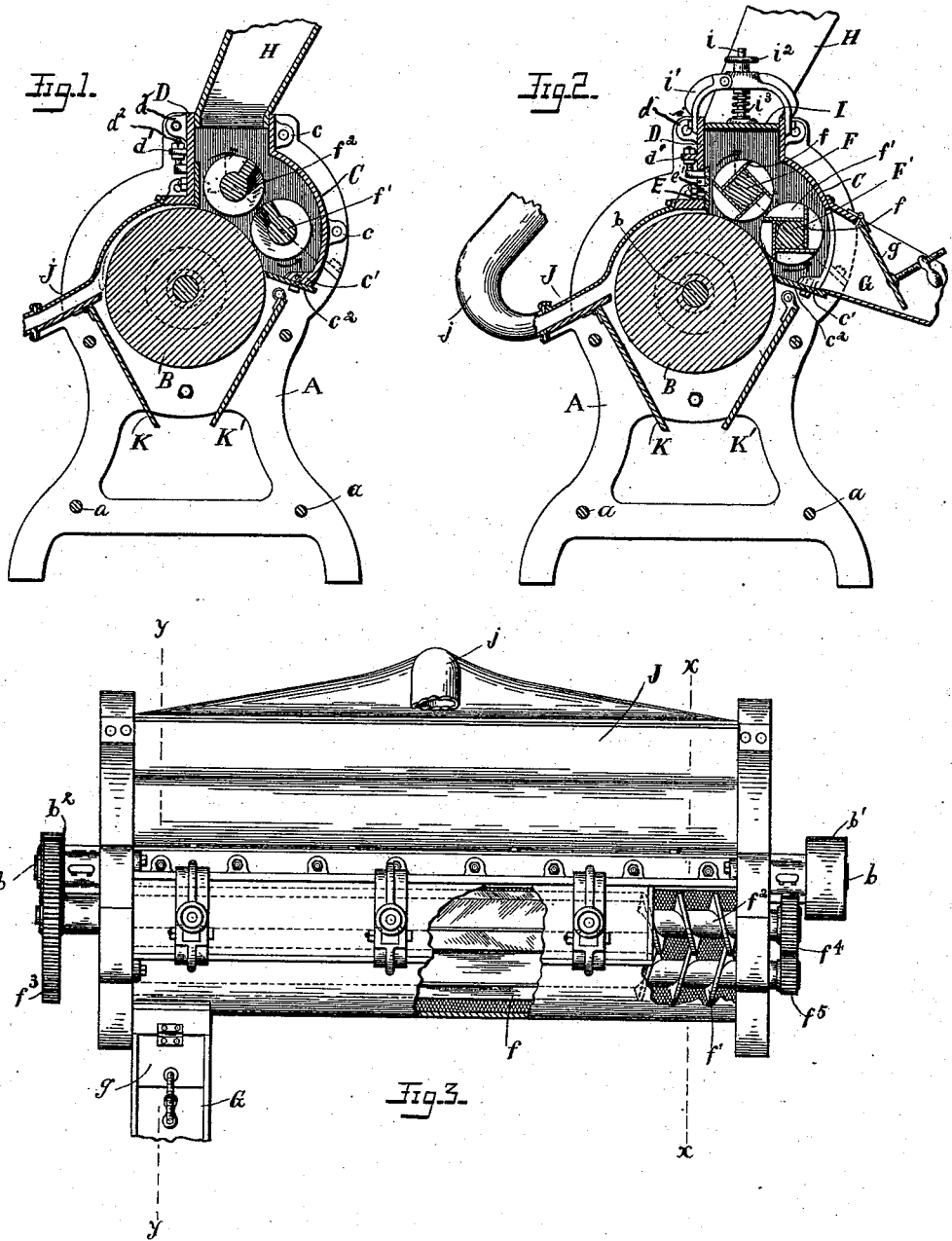

UNITED STATES PATENT OFFICE.

GEORGE W. WASHBURN, OF MEMPHIS, TENNESSEE, ASSIGNOR TO THE NATIONAL COTTON SEED OIL AND HULLER COMPANY, OF SAME PLACE.

MACHINE FOR DELINTING COTTON-SEED.

SPECIFICATION forming part of Letters Patent No. 543,202, dated July 23, 1895.

Application filed May 24, 1893. Serial No. 475,339. (No model.)

*To all whom it may concern:*

Be it known that I, GEORGE W. WASHBURN, a citizen of the United States, and a resident of Memphis, in the county of Shelby and State of Tennessee, have invented certain new and useful Improvements in Machines for Delinting Cotton-Seed, of which the following is a specification.

My invention relates to an improvement in machines for delinting cotton-seed, and is an improvement upon the invention for which Letters Patent No. 454,465 were granted to J. J. Faulkner, dated June 23, 1891. Its objects are, first, to provide means to feed the seed regularly to the delinting-chamber to prevent the feed from choking; second, to provide means for carrying the lint-bearing seed in contact with the abrading-cylinder and returning it repeatedly to the cylinder until the seed is thoroughly delinted.

It also consists in minor details of construction and combination of parts, all of which will be first fully described in connection with the accompanying drawings, and then particularly referred to and pointed out in the claims.

Referring to the drawings, in which like parts are indicated by similar reference-letters wherever they occur throughout the various views, Figure 1 is a transverse vertical section of the machine, taken through the feed-spout and conveyers on line $x\,x$ of Fig. 3. Fig. 2 is a central transverse section taken through line $y\,y$ of Fig. 3. Fig. 3 is a top view of the machine with the feed-spout removed and parts of the casing of the seed-chamber broken away to expose the means for returning the seed to the abrading-cylinder and feeding it from end to end of the machine. Fig. 4, Sheet 2, is a detailed view in central vertical section of the feed-spout and the device for feeding the seed to the seed-chamber. Fig. 5 is a side elevation of the same. Fig. 6 is a front elevation of the same. Fig. 7 is a side elevation of the opposite side of the feed-spout from that shown in Fig. 5. Fig. 8 is a side elevation of the agitator for loosening the seed. Fig. 9 is a similar view of one of the seed-feeding rolls. Fig. 10 is a detailed view in side elevation of the check-plate and its support. Fig. 11 is a vertical sectional view of the same through line $z\,z$ of Fig. 10. The views on Sheet 2 are all drawn upon an enlarged scale.

In this class of machines great difficulty has been experienced in supplying a regular feed of seeds to the delinter by reason of the matting of the seeds together. When fed down to the delinter through the feed-spout by means heretofore employed, the seeds formed an arch over the feeding devices, which would simply revolve without carrying the seed down until the spout became so clogged that it was necessary to force the feed by opening the door of the spout and crowding the lower portion of it down by hand, while the upper portion was held up, which was quite a dangerous operation and involved a great deal of trouble. By means of the agitator and feed-rolls herein illustrated this difficulty has been overcome completely.

Another serious defect of machines heretofore used consisted in the fact that the seed under treatment in the seed-chamber was not supplied regularly to the abrading-cylinder and check-plate, so as to have it repeatedly turned by the cylinder and thoroughly delinted and carried regularly from the feed to the discharge end of the machine while being treated by the delinter. These defects are overcome in the present machine by the peculiar arrangement of floats and conveyers, as illustrated.

Referring first to Sheet 1, I will describe the construction of my new machine.

A represents the end-supporting standards in which the operative parts of the machine are journaled and to which the outer casing, comprising the lint and seed chambers and the lower casing of the delinter, are attached. These standards are firmly braced apart by rods $a$, assisted by the outside casing.

B represents the abrading-cylinder, which is preferably a solid cylinder of emery or corundum, centrally perforated to receive the driving-shaft $b$, the cylinder being clamped firmly between disks at each end, screwed on to the shaft and keyed in place. The disks are shown in dotted line, Figs. 1 and 2.

The seed-chamber is formed by a concave shell C, which has outwardly-projecting lugs $c$ to receive bolts which secure it to the standards A. The lower end of the concave has an inwardly-projecting flange $c'$, underneath which is adjustably secured a steel plate or blade $c^2$, which projects inwardly in close proximity to the cylinder to close the bottom of the seed-chamber to prevent the seed from dropping outside of the chamber.

D is a vertical plate extending entirely across between the standards A, above the cylinder B and forming one wall of said chamber. The plate D has outwardly-projecting lugs $d$, through which pass bolts to secure it to the standards A. It has also, midway of its height, perforated lugs $d'$ to receive set-screws $d^2$ for adjusting the check-plate E. This is accomplished by means of the studs $e$, which project through vertical slots in the plate D to the outside and the lower ends of the screw-shafts $d^2$, which are swiveled into the studs $e$. The plate E is held firmly against the plate D by bolts $e'$, which pass through the plate E and through vertical slots in the plate D, and have nuts on the outside to join the plates together. To adjust the check-plate with relation to the abrading-cylinder, it is necessary to loosen the bolts $e'$, and one or other of the nuts on the screw which passes through the lugs $d'$ turns the other nut until the plate is elevated or lowered, after which the loosened nut is again tightened, locking the screw $d^2$ rigidly and holding the plate to the proper adjustment.

It should be stated here that the purpose of adjusting the plate to or from the abrading-cylinder is to permit as large an opening between the two as possible for the passage of the lint without permitting the seeds to pass, so that the seeds will come partially under the edge of the plate and be turned by the abrading-cylinder until the lint is taken off, when the seeds will be crowded up the smooth face of the check-plate, carried around by the floats, and when freed from lint will fall to the bottom of the chamber. There are two of these floats for delivering the lint-bearing seed to the abrading-surface of the emery-cylinder, both of which are alike in construction, but are geared to revolve in opposite directions. The floats are constructed as follows: F and F' are similar parallel shafts, which have their bearing in boxes in the ends A. The ends of the shafts are turned off true to fit the boxes, while the intermediate portions are square, and upon the square portions are secured the float-blades $f$, which extend from the conveyers to the tail end of the machine, and the edges of these blades project beyond the face of the adjacent blades to form wings for catching the seed and carrying it around to the cylinder. The edges of these blades, when revolving, nearly touch the cylinder. Upon the shafts F and F', below the feed-spout, are secured spiral conveyers $f'$ and $f^2$, the flights upon which are arranged to feed the seed upon the wings and crowd the seed under treatment toward the delivery end of the seed-chamber and force the delinted seed into the discharge-spout G, which is provided with a weighted valve $g$, having a weight upon a screw, adjustable for the purpose of retaining the seed within the delinting-chamber until thoroughly delinted. The shaft of cylinder B extends outside of the machine and is fitted with a pulley $b'$ upon one end and a gear-wheel $b^2$ upon the opposite end. The gear-wheel $b^2$ meshes with the larger gear-wheel $f^3$, which is secured upon the extended end of the shaft F of the upper float. Upon the opposite end of this shaft is secured a cog-wheel $f^4$, which meshes with the pinion $f^5$, which is secured upon the extended end of the lower float-shaft F'. By this arrangement the upper float-shaft F is revolved at a slower speed than the lower float-shaft F' and in opposite directions. The seeds are thus delivered to the seed-chamber from the feed-spout H and placed first upon the conveyers $f'$ and $f^2$, which feed them toward the end of the machine, where they are brought under the action of the blades. A considerable portion of the seed is forced by the conveyers against the delinting-cylinder and carried up against the check-plate E, which prevents the seed from passing around into the delinting-chamber. While the seeds are held in this position against the check-plate, the abrading-cylinder B, acting upon them, turns them around continually so long as there is any lint to adhere to the seeds or until they are forced up the check-plate and carried over to be thrown upon the lower conveyer at the head end of the machine and upon the lower float-shaft F' after the seeds have passed through the conveyers.

The upper float F, it will be seen, revolves in an opposite direction from the cylinder B, and its tendency is to carry the seed up toward the check-plate and from the upper portion of the check-plate around to be delivered upon the lower floats, which, revolving at a higher speed and in the same direction as the cylinder B, throws the seed against the cylinder B. The seeds that are delinted will not be carried up by the cylinder, but drop by gravity to the bottom of the seed-chamber, while those that still have any lint adhering to them will be caught by the abrading-cylinder and again carried up against the check-plate to be a second time carried over and thrown upon the lower floats. It will be seen that by this operation the seeds are continuously brought against the abrading-cylinder to be carried by it against the check-plate so long as any lint adheres to the seed, and when freed from lint will drop by gravity to the bottom of the case, to be delivered out through the discharge-spout G.

If it is found that the seeds passing through the discharge-spout are not thoroughly delinted, the adjusting-weight $g'$ is moved outward, so as to hold the valve $g$ closed with greater force to retain the seeds within the chamber until they have received proper treatment. If, on the other hand, it is found that the delinted seeds have been rubbed more than desirable, the weight on the valve is moved in the opposite direction or removed entirely to make the discharge more free, so that the seeds will only be subjected to the action of the cylinder, so as to thoroughly delint them without breaking or abrading the hulls.

The top of the seed-chamber is the board I, which fits between the plate D and the vertical upper edge of the concave C between the feed-spout and the tail end of the machine. This plate is hung upon the shafts $i$, which are swiveled to the top of the plate and pass through the central bosses of the yokes $i'$, which are also secured to the upper edge of the concave C and plate D. The shafts $i$ are screw-threaded at their upper end to receive the screw-threaded wheels or nuts $i^2$, by which the parts may be adjusted up and down in the upper neck of the seed-chamber. The top I is held within the upper portion of the seed-chamber by spring-pressure by springs $i^3$, which are coiled around the shaft $i$ between the yoke and the top I. The spring being compressed between the yoke and top of the board tends to press it downwardly, while the shaft of the screw $i$, passing through a plain perforation in the yoke and fitted with a screw-wheel $i^2$ on the top, limits the downward movement of the board I and permits of the board being adjusted vertically within the upper portion of the seed-chamber.

It sometimes happens that the machine is fed too fast or crowded. In such case the board is adapted to slide upward to relieve the pressure within and prevent injury to the parts.

The lint-chamber J extends the full length of the machine in the form of a flattened tube and terminates at its center in an upturned spout $j$, which is to connect with the exhaust-spout. (Not shown.) The upper portion of the lint-chamber is concentric with the abrading-cylinder, while the lower portion extends in a straight line to within a short distance of the abrading-cylinder and parallel with the upper flattened portion of the exhaust-tube.

K and K' are boards partially inclosing the lower portion of the abrading-cylinder, but allowing ample space between their lower edges for the admission of air to the exhaust-tube. The air passing from this portion to the exhaust-tube will strip the cylinder of any lint which adheres to it and carry it from the exhaust-tube to the lint-chamber or condenser, which may be of ordinary construction, and for that reason are not shown.

Across the lower end of the feed-spout are arranged two grooved and toothed feed-rolls L and L', and above the bite of these rolls is journaled a shaft M, which has pins $m$ passed through the shaft at right angles to each other, the ends of these pins being turned at a right angle or parallel with the shaft, as clearly shown in Fig. 8. The object of this "agitator," as I term it, is to break up and separate the seed before they are allowed to fall upon the feed-rolls L and L'.

There is loosely mounted upon the shaft of roll L a pulley-band $l$, which receives a belt from any source of power by which the pulley is driven, and upon the same shaft inside of the belt is journaled the pinion $l^4$, which is secured to the pulley to revolve with it and which meshes with the gear-wheel $l'$, secured upon the protruding end of the feed-roll L'. Upon the opposite end of this feed-roll is secured a pinion $l^2$, which meshes with the gear $l^3$, which is secured upon the upper feed-roll shaft, and this gear in turn meshes with the gear-wheel $m'$, which is secured upon the shaft M. The teeth of the feed-rolls L and L' incline in the direction of the feed between the rolls; but the teeth of one roll are set opposite the grooves in the other and the space between the two is sufficient to permit the seed to pass without being crushed. The upper roll L revolves at a much lower speed than the roll L', so that the seed that is carried into the bite of the two rolls will be forced more rapidly through the grooves in the roll L by the higher-speeded roll L' and the seed separated and delivered into the seed-chamber, while the turned ends of the hooked rods $m$, which revolve slowly, will prevent the body of seed above from matting and arching to choke the feed.

I find a great advantage in using a solid emery-cylinder, as after it becomes worn somewhat smooth it may be dressed down to give it its original rough surface, and the adjustable plates $c^2$ and check-plate E may be regulated to the diminished size of the roll.

What I claim as new, and desire to secure by Letters Patent, is—

1. In a cotton seed delinting machine of the character described, the combination of the case, the abrading cylinder mounted therein, the check plate dividing the case into the seed chamber upon one side of the plate, and the lint chamber upon the opposite side, a feed spout for the lint bearing seed at one end of the seed chamber, and a discharge spout for the delinted seed at the opposite end of said chamber, two shafts, having their axes parallel with the axes of the abrading cylinder and geared to revolve in opposite directions within the seed chamber, spiral conveyers mounted upon each of said shafts, underneath the feed spout, to force the seed toward the delivery end of the seed chamber, the floats secured upon said shafts and extending inward to near the path of the abrading cylinder and from the conveyers to the delivery end of the seed chamber, to repeatedly return the seed passing through the seed chamber to the abrading cylinder, and an exhaust flume connected to the lint chamber to convey the lint from the machine, substantially as shown and described.

2. The combination, substantially as hereinbefore set forth, of the end standards, A, the abrading cylinder and float and conveyer shafts mounted to revolve therein, the concave, C, the lower plate, $c^2$, at the bottom of the concave extending into near the abrading cylinder, the check plate and a spring pressed top, forming the seed chamber, the feed spout, H, leading into the top of said chamber at one end and discharge spout for the delinted seed at the bottom of the seed chamber at the opposite end, the spiral conveyers mounted upon shafts below the feed spout, the floats F and F', extending from the conveyers to the delivery end of the machine to repeatedly return the seed to the abrading cylinder, the lint chamber opposite the seed chamber, the air exhaust spout to strip the lint from the cylinder, and the open bottom case partially inclosing the lower half of the abrading cylinder for the admission of air to the lint chamber.

3. In a cotton seed delinting machine, the combination of the delinting cylinder and inclosing casing, the feed spout H, the agitator shaft M arranged across said spout, the hooked pins $m$ secured therein, the feed rolls L and L' arranged below the agitator and parallel therewith, the seed rolls being circumferentially grooved to form annular rings, and said rings serrated to form teeth, the teeth upon the opposite rolls being arranged in opposite directions, and the rolls geared to move at different speeds, substantially as shown and described.

GEORGE W. WASHBURN.

Witnesses:
F. P. POSTON,
JNO. J. MURPHY.